United States Patent [19]
Williams

[11] Patent Number: 5,249,291
[45] Date of Patent: Sep. 28, 1993

[54] METHOD AND APPARATUS FOR CONSENSUAL DELEGATION OF SOFTWARE COMMAND OPERATIONS IN A DATA PROCESSING SYSTEM

[75] Inventor: Marvin L. Williams, Lewisville, Tex.

[73] Assignee: International Business Machines Corporation, Armonk, N.Y.

[21] Appl. No.: 616,286

[22] Filed: Nov. 20, 1990

[51] Int. Cl.$^5$ .......................... G06F 7/00; G06F 15/00
[52] U.S. Cl. ................................... 395/650; 395/700; 364/281.3; 364/284.4
[58] Field of Search ............... 395/600, 550, 650, 700, 395/200, 325, 800, 725; 364/514, 228.4, 242.94, 465, 225, 419, 241.8

[56]         References Cited
          U.S. PATENT DOCUMENTS

| | | | |
|---|---|---|---|
| 4,718,005 | 1/1988 | Feigenbaum et al. | 364/200 |
| 4,809,157 | 2/1989 | Eilert et al. | 364/200 |
| 5,008,853 | 4/1991 | Bly et al. | 364/900 |
| 5,093,918 | 3/1992 | Heyen et al. | 395/725 |
| 5,132,900 | 7/1992 | Gilchrist et al. | 364/419 |

Primary Examiner—Gareth D. Shaw
Assistant Examiner—Kevin Spivak
Attorney, Agent, or Firm—Andrew J. Dillon

[57]         ABSTRACT

A method and apparatus are disclosed for permitting the consensual delegation of selected software command operations by one user to another user in a data processing system. An Affinity Activity Object (AAO) is established and associated with a selected user. A plurality of parameters are then listed within the Affinity Activity Object (AAO) and these parameters are then utilized to identify selected software command operations, an identification of those users for which the associated user consents to undertake those software command operations and a selected time frame during which such undertaking will be permitted. In response to a request for delegation of a software command operation, these listed parameters are then evaluated and only those selected software command operations satisfying the listed parameters are delegated to the associated user. By negotiating the establishment of an Affinity Activity Object (AAO) for both client and delegate users the delegation of software command operations may be efficiently controlled while allowing users to specify the degree and extent of an affinity relationship established thereby.

7 Claims, 4 Drawing Sheets

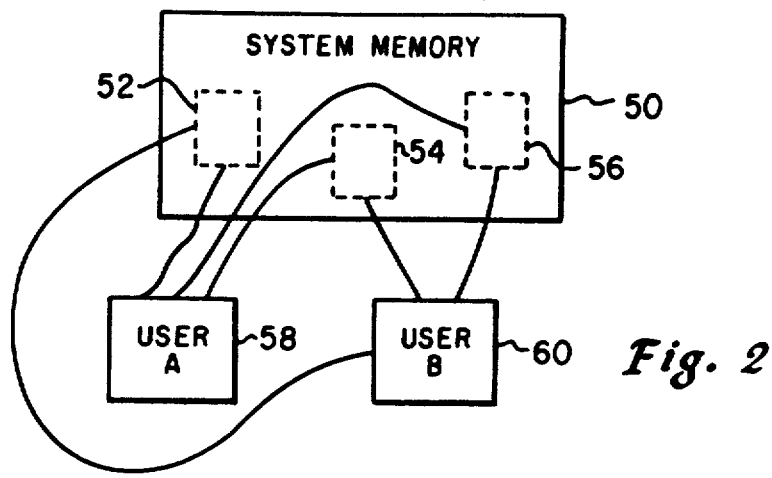

Fig. 2

| MARY's DELEGATE AFFINITY REQUEST/OBJECT | | | |
|---|---|---|---|
| CLIENT | OPERATION | START TIME | END TIME |
| Marvinw@Dalhqic1 | Receive Mail | 1-10-90 | 5-10-90 |
| JoeG@Mvsm1,Fred@Dalhqic1 | Receive Mail | 1-10-90 | INDEFINITE |
| Marvinw@Dalhqic1 | Send Mail | 1-10-90 | 5-10-90 |
| Betty@Mvsm1 | Calendar | 3-10-90 | 6-10-93 |

Fig. 3

| MARVINW's CLIENT AFFINITY/REQUEST/OBJECT | | | |
|---|---|---|---|
| DELEGATE | OPERATION | START TIME | END TIME |
| Mary@Dalhqic1 | Receive Mail | 1-10-90 | 5-10-90 |
| Diana@Mvsm1 | Library | 1-10-90 | INDEFINITE |
| Alice@Dalhqic1 | Send Mail | 1-10-90 | 5-10-90 |
| Betty@Mvsm1 | Calendar | 3-10-90 | 6-10-93 |

Fig. 4

METHOD AND APPARATUS FOR CONSENSUAL DELEGATION OF SOFTWARE COMMAND OPERATIONS IN A DATA PROCESSING SYSTEM

BACKGROUND OF THE INVENTION

1. Technical Field

The present invention relates in general to the field of data processing systems and in particular to the field of distributed data processing systems which permit an affinity relationship to be established between multiple users wherein such users share selected software command operations. Still more particularly, the present invention relates to distributed data processing systems which permit the consensual delegation of selected software command operations.

2. Description of the Related Art

Distributed data processing systems are well known in the prior art. Such systems generally permit a plurality of end users to be simultaneously coupled via a network to a central processor or alternatively, permit multiple computers or work stations to be coupled together in a so-called Local Area Network (LAN). Such systems often permit multiple users to share computer assets or objects such as documents, databases, files, programs, computational facilities, or electronic mail facilities.

In the modern electronic office environment, it is common for a data processing system to permit an individual, often referred to as a "client" to delegate software command operations to other individuals, within the office. Such individuals are generally referred to as "delegates." In a so-called "affinity" relationship, two individuals may share access to a common address space within the system memory. For example, a secretary may have an affinity relationship with her employer which permits her to access electronic mail addressed to her employer. This affinity relationship is also often referred to as a "privilege" relationship, wherein one individual has the "privilege" of accessing software command operations which are normally only accessible by a second individual.

While existing distributed data processing system permit the designation of one individual as a delegate on behalf of another individual or client, modern state-of-the-art data processing systems assume that the delegate wishes to take responsibility for such command operations. There exists no mechanism in the prior art which permits a delegate to control the amount of processing which that individual is willing to undertake on behalf of another user. Further, known systems do not permit a user who has been delegated by another user to limit the amount of time during which that individual is willing to undertake selected software command operations.

Therefore, it should be obvious that a need exists for a method and apparatus whereby users within a distributed data processing system may simply and efficiently negotiate affinity relationships whereby the amount of processing to be undertaken by one user on behalf of another user for a selected time frame during which this activity will occur may be mutually agreed upon.

SUMMARY OF THE INVENTION

It is therefore one object of the present invention to provide an improved data processing system.

It is another object of the present invention to provide a method and apparatus for permitting an affinity relationship to be established between multiple users wherein such users share selected software command operations.

It is yet another object of the present invention to provide an improved distributed data processing system which permits the consensual delegation of selected software command operations.

The foregoing objects are achieved as is now described. The method and apparatus of the present invention permits the consensual delegation of selected software command operations by one user to another user in a data processing system. An Affinity Activity Object (AAO) is established and associated with a selected user. A plurality of parameters are then listed within the Affinity Activity Object (AAO) and these parameters are then utilized to identify selected software command operations, an identification of those users for which the associated user consents to undertake those software command operations and a selected time frame during which such undertaking will be permitted. In response to a request for delegation of a software command operation, these listed parameters are then evaluated and only those selected software command operations satisfying the listed parameters are delegated to the associated user. By negotiating the establishment of an Affinity Activity Object (AAO) for both client and delegate users the delegation of software command operations may be efficiently controlled while allowing users to specify the degree and extent of an affinity relationship established thereby.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 depicts a pictorial representation of multiple data processing system users in an affinity relationship;

FIG. 3 depicts a user interface screen illustrating a pictorial representation of an Affinity Activity Object (AAO) which may be utilized to depict a consensual delegate relationship;

FIG. 4 depicts a user interface screen illustrating a pictorial representation of an Affinity Activity Object (AAO) which may be utilized to depict a consensual client relationship;

DETAILED DESCRIPTION OF PREFERRED EMBODIMENT

Figure 1:
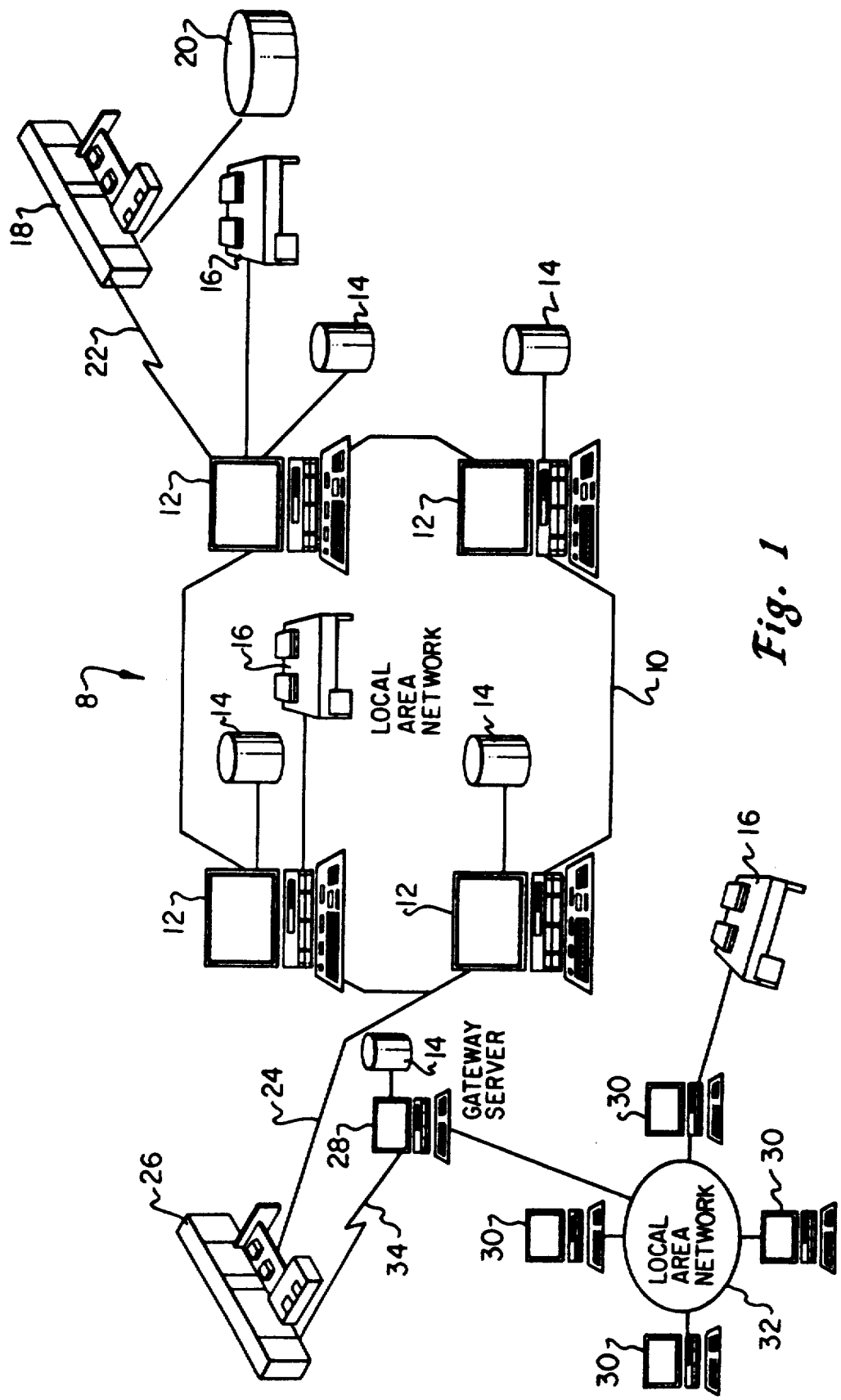
FIG. 1 depicts a pictorial representation of a distributed data processing system which may be utilized to implement the method and apparatus of the present invention.

With reference now to the figures and in particular with reference to FIG. 1, there is depicted a pictorial representation of a distributed data processing system 8 which may be utilized to implement the method and apparatus of the present invention. As may be seen, distributed data processing system 8 may include a plurality of networks, such as Local Area Network (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common in such distributed data processing systems, each individual computer may be coupled to a storage device 14 and/or a printer/output device 16. One or more such storage devices 14 may be utilized, in accordance with the method and apparatus of the present invention, to store various documents or software applications which may be accessed by a client user or his or her delegate within distributed data processing system 8, in accordance with the method and apparatus of the present invention.

In a manner well known in the prior art, each such document or software application may be stored within a storage device 14, which is associated with distributed data processing system 8, and which is accessible by any user within distributed data processing system 8 having authority to do so. Additionally, an Affinity Activity Object (AAO) is preferably stored within a storage device 14 associated with a selected user and thereafter utilized, in a manner which will be explained in greater detail herein, to control the establishment of consensual delegation relationships.

Still referring to FIG. 1, it may be seen that distributed data processing network 8 may also include multiple mainframe computers, such as mainframe computer 18, which may be preferably coupled to Local Area Network (LAN) 10, by means of communications link 22. Mainframe computer 18 may also be coupled to a storage device 20 which may serve as remote storage for a Local Area Network (LAN) 10 and may be coupled via communications controller 26 and communications link 34 to a gateway server 28. Gateway server 28 is preferably an individual computer or Intelligent Work Station (IWS) which serves to link Local Area Network (LA) 32 to Local Area Network (LAN) 10.

As discussed above, with respect to Local Area Network (LAN) 32 and Local Area Network (LAN) 10, a plurality of data objects, databases or documents may be stored within storage device 20 and controlled by mainframe computer 18 as resource manager or library service for the data objects and documents thus stored. Of course, those skilled in the art will appreciate that mainframe computer 18 may be located a great geographical distance from Local Area Network (LAN) 10 and similarly, Local Area Network (LAN) 10 may be located a substantial distance from Local Area Network (LAN) 32. That is, Local Area Network (LAN) 32 may be located in California, while Local Area Network (LAN) 10 may be located within Texas and mainframe computer 18 may be located in New York.

As will appreciated upon reference to the foregoing, it is often desirable for users within one portion of distributed data processing network 8 to access a database, data object or document stored in distributed data processing network 8 which is normally controlled by another user. In order to maintain a semblance of order within distributed data processing network 8, it is often desirable to implement an access control program whereby individual users may grant access to other users, or delegates, to undertake selected software command operations on behalf of the first user. This is generally accomplished by designating a user as a delegate for a client user and granting authority for that delegate user to access those documents or software operations within the designated memory space for the client user.

Modern distributed data processing systems permit such designation; however, the designation occurs without regard to the question of whether or not the designated delegate user desires to undertake selected software command operations on behalf of the client user. Therefore, it should be obvious that a need exists for a method and apparatus whereby the consensual delegation of selected software command operations may be accomplished.

Referring now to FIG. 2, there is depicted a pictorial representation of multiple data processing system users in an affinity relationship. As is illustrated, system memory 50 is depicted schematically and includes various memory regions 52, 54 and 56 therein. Of course, those skilled in the art will appreciate that system memory 50 may encompass remote storage located at multiple different points within distributed data processing system 8 (see FIG. 1). As is graphically illustrated, user A 58 and user B 60 are both permitted to access memory regions 52, 54 and 56. This illustration contained within FIG. 2 graphically depicts the so-called "affinity" relationship whereby two system users are permitted to access the same address space within system memory 50.

With reference now to FIG. 3, there is depicted a user interface screen 70 which illustrates a pictorial representation of an Affinity Activity Object (AAO) which may be utilized to establish a consensual delegate relationship. User interface screen 70 is preferably presented to a user via a computer display at any of the computer or terminal devices depicted within FIG. 1. User interface screen 70 preferably includes multiple columns, each column containing a parameter which may be utilized to define the delegate relationship between the user at that computer or terminal and various other client users.

As illustrated, the Affinity Activity Object (AAO) is a self-identifying object which may be created, modified, or activated by an individual user which may be utilized to graphically illustrate the delegate relationships which a particular user has consented to undertake. As illustrated in FIG. 3, column 72 lists multiple clients. Adjacent each client's name within column 72 is a selected operation listed within column 74 and a start time and end time listed within columns 76 and 78, respectively. Therefore, upon reference to user interface screen 70, it may be seen that user MARY has agreed to undertake four different delegate relationships. As an example, user MARY has agreed to undertake a delegate relationship on behalf of user MARVIN whereby MARY will agree to receive MARVIN'S mail during the period beginning Jan. 10, 1990, and ending May 10, 1990. In a manner which will explained in greater detail herein, MARY, by creating and modifying the Affinity Activity Object (AAO) depicted within FIG. 3 may simply and efficiently control the specific software command operations which will be undertaken on behalf of selected clients and further limit the time frame during which such operations may occur.

Referring now to FIG. 4, there is depicted a user interface screen 80 which illustrates a pictorial representation of an Affinity Activity Object (AAO) which may be utilized to depict a consensual client relationship. As above, the Affinity Activity Object (AAO) depicted within user interface screen 80 includes multiple columns which list the identity of those delegates which the user in question has denoted for selected operations during a selected time frame. Thus, user MARVIN has designated delegate user MARY, within column 82 to receive his mail, as listed within column 84. Further, this delegate relationship has been requested during the period Jan. 10, 1990 through May 10, 1990, as depicted in columns 86 and 88. Thus, upon reference to FIGS. 3 and 4, those skilled in the art will appreciate that MARVIN'S mail will be forwarded to MARY since MARVIN has requested a delegate relationship with MARY and the Affinity Activity Object (AAO) established by MARY indicates that she is willing to undertake this task.

Upon reference to FIGS. 3 and 4, those skilled in the art will appreciate that these Activity Affinity Objects (AAO) may be utilized to negotiate the establishment of a client/delegate affinity relationship whereby the selected tasks and time frames for undertaking these tasks may be negotiated between two data processing system users in an electronic dialog, in a manner which will be depicted in greater detail herein.

Figure 5:
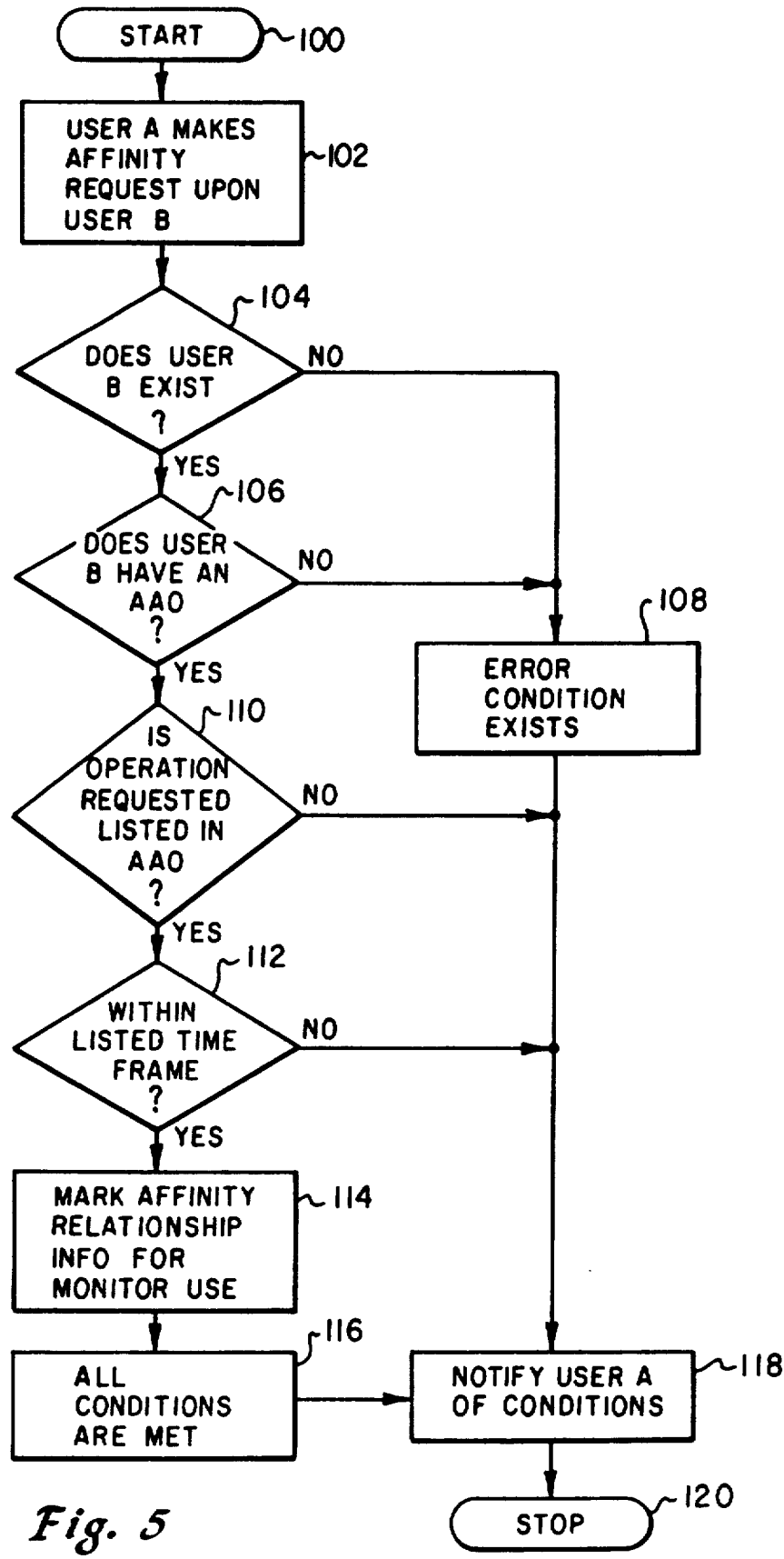
FIG. 5 is a high level flow chart illustrating a request for a consensual delegation relationship between two data processing system users in accordance with the method and apparatus of the present invention.

With reference now to FIG. 5, there is depicted a high level flow chart which illustrates a request for a consensual delegation relationship between two data processing system users in accordance with the method and apparatus of the present invention. The process begins at block 100 and thereafter passes to block 102 which illustrates User A making an affinity request upon User B.

Of course, it should be apparent to those skilled in the art that this process will be identical whether User A is asking User B to become a delegate user and undertake operations on behalf of User A or User A is asking User B to enter a client relationship, that is User A wishes to undertake selected software command operations on behalf of User B.

Next, the process passes to block 104, which illustrates a determination of whether or not User B exists within the data processing system. It should be apparent that an affinity relationship cannot be established if one of the users within the proposed relationship does not exist within the data processing system. If User B does not exist within the data processing system, as determined in block 104, the process passes to block 108 Which illustrates the creation of an error condition.

Referring again to block 104, if the system has determined that User B does exist, the process passes to block 106. Block 106 illustrates a determination of whether or not User B has an Affinity Activity Object (AAO). This is necessary, as will be apparent upon reference to the present specification, to ensure that User B has consented to the affinity relationship which is to be established. In the event User B does not have an Affinity Activity Object (AAO) the process again passes to block 108 to create an error condition message. Of course, those skilled in the art will appreciate that in the event User B does not have an Affinity Activity Object (AAO) the system may permit an affinity relationship to be established as a default option.

Referring again to block 106, in the event User B does have an Affinity Activity Object (AAO), the process passes to block 110, which illustrates a determination of whether or not the operation requested is listed within that Affinity Activity Object (AAO). If not, the process passes to block 118 which illustrates the notification of User A regarding the conditions which were not met in the Affinity Activity Object (AAO) of User B.

Referring again to block 110, if the operation requested in the affinity request is listed within User B's Affinity Activity Object (AAO) the process passes to block 112 which depicts a determination of whether or not the request falls within the listed time frame. Recalling the Affinity Activity Objects (AAO) depicted in FIGS. 3 and 4, it should be noted that each operation includes a designated start time and end time during which that operation will be undertaken. If the requested operation is not occurring within the listed time frame, the process passes to block 118 which illustrates the notification of User A of the conditions within User B's Affinity Activity Object (AAO) which were not met.

If the operation requested is within the listed time frame contained within User B's Activity Affinity Object (AAO) as determined in block 112, the process then passes to block 114, which depicts the marking of the affinity relationship information for monitor use. Next, block 116 indicates that all conditions have been met and the process passes to block 118, notifying User A of that fact. Thereafter, the process terminates, as illustrated in block 120.

Figure 6:
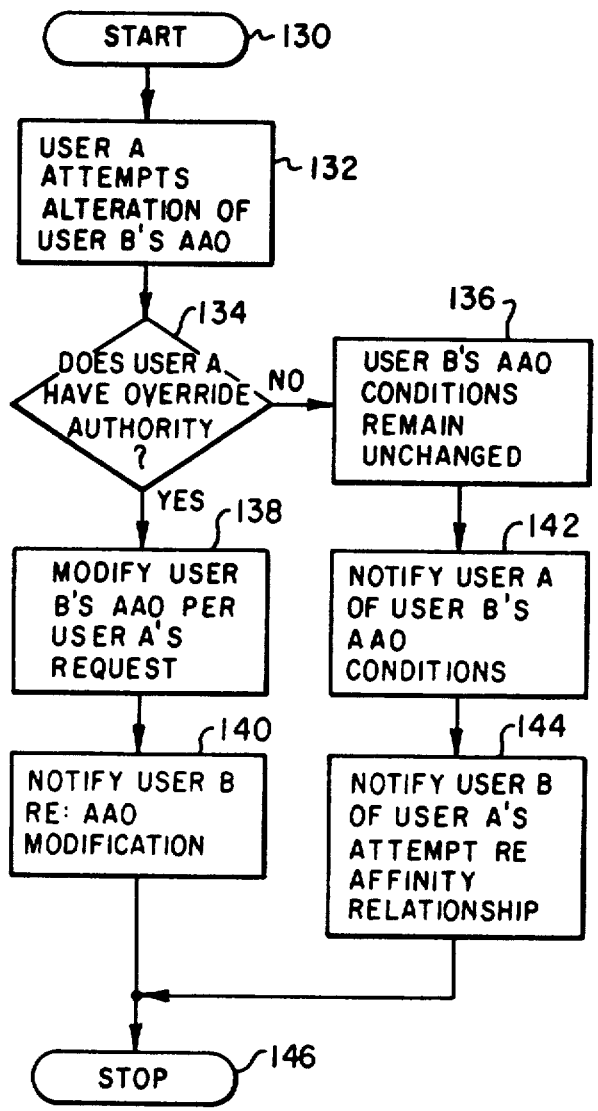
FIG. 6 is a high level flow chart illustrating the negotiation of a modification to a consensual delegation relationship in accordance with the method and apparatus of the present invention.

Referring now to FIG. 6, there is depicted a high level flow chart which illustrates the negotiation of a modification to a consensual delegate relationship, in accordance with the method and apparatus of the present invention. Once again, it should be appreciated by those skilled in the art that User A in the example depicted within FIG. 6 may be a client user or a delegate user in an affinity relationship within a distributed data processing system.

As above, this process begins at block 130 and thereafter passes to block 132 which illustrates an attempt by User A to alter User B's Affinity Activity Object (AAO). Thereafter, the process passes to block 134 which depicts a determination of whether or not User A has override authority with respect to User B. That is, does User A have authority to insist that the attempted modification to User B's Affinity Activity Object (AAO) take place. If not, the process passes to block 136 which illustrates the fact that User B's Affinity Activity Object (AAO) conditions will remain unchanged. Thereafter, the process passes to block 142 which illustrates the notifying of User A of the conditions within User B's Affinity Activity Object (AAO) which would not permit the desired alteration. Next, block 144 depicts the notifying of User B that User A has attempted to establish an affinity relationship. The process then terminates, as illustrated in block 146.

Referring again to block 134, if User A has override authority with respect to User B, as determined within block 134, then the process passes to block 138 which illustrates the modification of User B's Affinity Activity Object (AAO) in accordance with the request by User A. Thereafter, block 140 illustrates the notification of User B regarding the modification to User B's Affinity Activity Object (AAO). The process then again terminates, as depicted in block 144.

Figure 7:
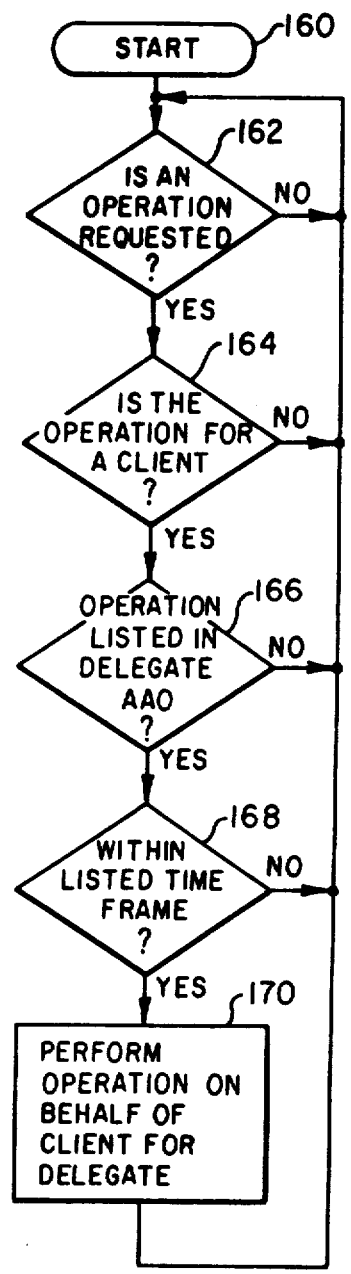
FIG. 7 is a high level flow chart illustrating the monitoring and execution of a software command operation in accordance with the method and apparatus of the present invention.

Finally, with reference to FIG. 7, there is depicted a high level flow chart illustrating the monitoring and execution of a software command operation in accordance with the method and apparatus of the present invention. As above, this process begins at block 160 and thereafter passes to block 162 which depicts a determination of whether or not an operation has been requested. If not, the process merely iterates until such time as an operation has been requested.

Next, the process passes to block 164 which illustrates a determination of whether or not the requested operation is an operation for a client. Recalling that a client is a system user who is permitted to delegate authority for selected software command operations to another user, block 164 is utilized to determine whether or not the operation may be delegated in accordance with such relationship. In a system which utilizes the method and apparatus of the present invention, a user may be a "client" only if that user is listed as a client within an Affinity Activity Object (AAO), or the system permits the establishment of an affinity relationship as a default condition. If not, the process again iterates and returns to block 162 to await a subsequent operation request.

Referring again to block 164, in the event the operation which has been requested is an operation for a user who has been designated as a client, then the process passes to block 166 which depicts a determination of whether or not the operation is listed within the Affinity Activity Object (AAO) of the delegate user. If not, the process returns to block 162 to await a request for a subsequent operation.

In the event the operation is listed within the Affinity Action Object (AAO) of the delegate user, the process passes to block 168 which depicts a determination of whether or not the operation is occurring within the listed time frame of the Affinity Activity Object (AAO). If not, the process again returns to block 162 to await a request for a subsequent operation. However, in the event the operation requested is listed within the Affinity Activity Object (AAO) of the delegate user and occurs within the listed time frame, as determined in blocks 166 and 168, the process passes to block 170 which illustrates the performing of the operation on behalf of the client for the delegate. Thereafter, the process returns to block 162 to await the request of a subsequent operation.

Upon reference to the foregoing, those skilled in the art will appreciate that the Applicant has provided a novel and useful method and apparatus whereby individual users within a distributed data processing system may enter into affinity relationships whereby software command operations may be consensually delegated. By permitting a client user and a delegate user to negotiate the conditions under which software command operations will be delegated the method and apparatus of the present invention permits both users to efficiently control the amount of processing that will be performed on behalf of one user by the other. Further, the method and apparatus of the present invention permits both the client user and delegate user to specify the affinity relationship on the basis of selected software operations and selected time frames.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for permitting the consensual delegation by one user of selected software command operations to another user within said data processing system, said method comprising the data processing system implemented steps of:
   establishing at least one affinity activity object associated with a user within said data processing system;
   listing within said at least one affinity activity object a plurality of parameters identifying selected software command operations which said user associated therewith consents to undertake on behalf of another user;
   evaluating said plurality of parameters within said at least one affinity activity object in response to an attempted delegation of software command operations to said user; and
   delegating only selected software command operations to said user in response to said evaluation of said plurality of parameters within said at least one affinity activity object.

2. The method in a data processing system for permitting the consensual delegation by one user of selected software command operations to another user within said data processing system according to claim 1, wherein said step of listing within said at least one affinity activity object a plurality of parameters identifying selected software command operations which said user associated therewith consents to undertake on behalf of another user includes the step of identifying a particular user for which said user consents to undertake said selected software command operations.

3. The method in a data processing system for permitting the consensual delegation by one user of selected software command operations to another user within said data processing system according to claim 1, wherein said step of listing within said at least one affinity activity object a plurality of parameters identifying selected software command operations which said user associated therewith consents to undertake on behalf of another user includes the step of identifying a selected time period during which said user consents to undertake said selected software command operations.

4. The method in a data processing system for permitting the consensual delegation by one user of selected software command operations to another user within said data processing system according to claim 1, further including the step of notifying a user attempting to delegate a software command operation in response to said evaluation of said plurality of parameters within said at least one affinity activity object.

5. A data processing system for permitting the consensual delegation by one user of selected software command operations to another user within said data processing system, said data processing system comprising:
   at least one affinity activity means associated with a user within said data processing system, said at least one affinity activity means having a plurality of parameters stored therein, said affinity activity means for identifying selected software command operations which said user associated therewith consents to undertake on behalf of another user;
   evaluation means for evaluating said plurality of parameters within said at least one affinity activity means in response to an attempted delegation of software command operations to said user; and delegation means for delegating only selected software command operations to said user in response to said evaluation of said plurality of parameters within said at least one affinity activity means.

6. The data processing system for permitting the consensual delegation by one user of selected software command operations to another user within said data processing system according to claim 5, wherein at least one of said plurality of parameters stored within said at least one affinity activity means identifies a particular user for which said user consents to undertake said selected software command operations.

7. The data processing system for permitting the consensual delegation by one user of selected software command operations to another user within said data processing system according to claim 5, wherein at least one of said plurality of parameters stored within said at least one affinity activity means identifies a selected time period during which said user consents to undertake said selected software command operations.

* * * * *